(12) United States Patent
Nelson et al.

(10) Patent No.: US 9,471,299 B1
(45) Date of Patent: Oct. 18, 2016

(54) UPDATING CODE WITHIN AN APPLICATION

(71) Applicant: Amazon Technologies, Inc., Reno, NV (US)

(72) Inventors: Michael Thor Nelson, Tukwila, WA (US); Steven Eric Schiesser, Seattle, WA (US); Mobeen Fikree, Seattle, WA (US); Christopher Lawrence Lavin, Seattle, WA (US); Anthony Warren Sajec, Bothell, WA (US); Tuan Duy Le, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 13/850,112

(22) Filed: Mar. 25, 2013

(51) Int. Cl.
 *G06F 9/44* (2006.01)
 *G06F 9/445* (2006.01)

(52) U.S. Cl.
 CPC .. *G06F 8/65* (2013.01); *G06F 8/71* (2013.01)

(58) Field of Classification Search
 CPC .......................................................... G06F 8/65
 USPC .......................................................... 717/170
 See application file for complete search history.

(56) References Cited

U.S. PATENT DOCUMENTS

| | | | |
|---|---|---|---|
| 6,199,203 B1* | 3/2001 | Saboff | 717/168 |
| 7,480,907 B1* | 1/2009 | Marolia et al. | 717/174 |
| 7,523,158 B1* | 4/2009 | Nickerson et al. | 709/203 |
| 2001/0008024 A1* | 7/2001 | Inaba | 717/11 |
| 2008/0115208 A1* | 5/2008 | Lee | G06F 21/31 726/19 |
| 2008/0120609 A1* | 5/2008 | Gates et al. | 717/168 |
| 2010/0121906 A1* | 5/2010 | Ku | G06F 8/60 709/202 |
| 2011/0010699 A1* | 1/2011 | Cooper et al. | 717/169 |
| 2012/0046069 A1* | 2/2012 | Cupala et al. | 455/550.1 |

\* cited by examiner

*Primary Examiner* — James D Rutten
(74) *Attorney, Agent, or Firm* — Thomas | Horstemeyer, LLP

(57) ABSTRACT

Disclosed are various embodiments for providing updateable code to a software library executed in a client device. Updateable code includes scripting language code and potentially other content employed by a software library invoked by an application executed by a client device. Updateable code can be updated upon launch of the application and/or upon invocation of a call associated with the software library.

22 Claims, 6 Drawing Sheets

UPDATING CODE WITHIN AN APPLICATION

BACKGROUND

Applications that are distributed via an application marketplace often employ code fragments, functionality and/or one or more software libraries for the purpose of facilitating interactions with systems and/or services associated with the application marketplace. For example, an application can be created by a developer for distribution via an application marketplace that is operated by another entity, where the other entity can offer one or more software libraries with an application programming (API) interface that can be incorporated into the application. Updating of such functionality may require the creation of a new application binary.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing updates of software libraries that are employed by applications that are distributed via an application marketplace. Applications that are distributed via an application marketplace often employ code fragments, functionality and/or one or more software libraries for the purpose of facilitating interactions with systems and/or services associated with the application marketplace. For example, an application can be created by a developer for distribution via an application marketplace that is operated by another entity, where the other entity can offer one or more software libraries with an application programming interface (API) that can be incorporated into the application. Updating of such functionality may require the creation of a new application binary.

Accordingly, embodiments of the present disclosure can allow for the updating of content and/or logic that is employed by a software library that is bundled with an application without requiring the generation of a new binary associated with the application. For example, because an application marketplace is often operated by an entity that is different from a developer, updates to functionality provided by the software libraries bundled with an application can be performed without requiring the creation of a new application binary and distribution of the application binary to user devices. Instead, the application and/or software library, when invoked, can request an update to certain functionality provided by the software library, which is stored as scripting language code and/or other elements that do not require updating of object code and/or binary code of the application, and a service associated with the application marketplace can transmit the appropriate updates, which can then be stored within the client device on which the application is executing.

Figure 1A:
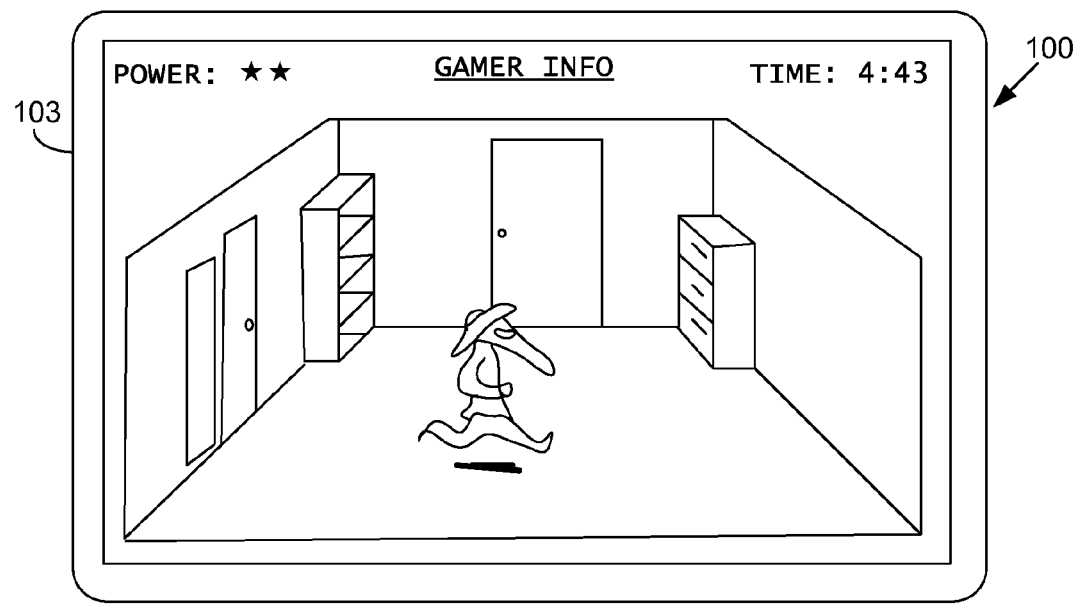
FIGS. 1A-1B are drawings of example application executed by client applications according to various embodiments of the present disclosure.
Figure 1B:
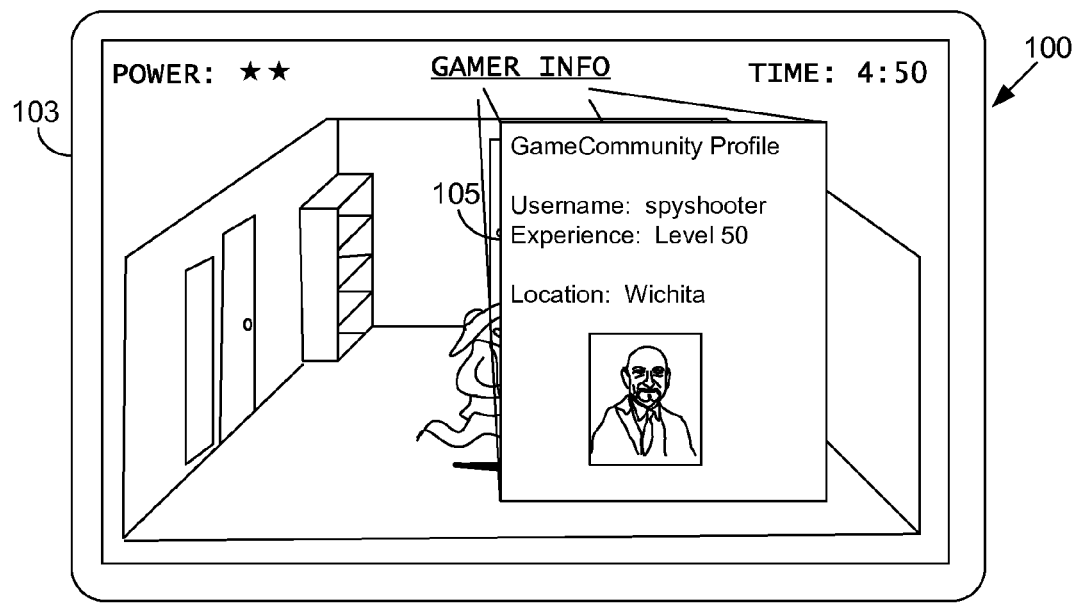

With reference to FIGS. 1A-1B, shown is an example scenario in which an application executed by a client device 103. In the scenario 100 shown in FIGS. 1A-1B, the application can be distributed by an application marketplace. The application can also take advantage of features provided by the application marketplace and/or any other third party service, where these features are included within a software library that is bundled with the binary version of the application. For example, a software library providing an API interface can provide user authentication and/or identification functionality whereby a user can authenticate his or her identity to a game service, a social networking service, or any other identity service.

As shown in the example of FIG. 1A, the application executed by the client device 103 can incorporate functionality in which a user may utilize an account held with a third party service for the purpose of tracking achievements, social networking, authentication, billing, or any other purpose. Accordingly, the application can provide functionality allowing a user to authenticate his or her identity with the third party service as well as potentially view user profile information and other data provided by the third party service. Authentication of the user as well as the viewing of additional information retrieved from the third party service from within the application can be accomplished via API calls into a software library that is incorporated into the executable binary of the application. For example, the third party service may provide a proprietary authentication protocol that is implemented within the software library such that the application makes a call to a black-box API interface that returns an authentication result. In such a scenario, the authentication logic is embedded within the third party service software library that is bundled with the application.

As shown in FIG. 1B, the application may also allow a user to view user profile information in a user interface 105, where the user profile information is retrieved from a third party service. It should be appreciated that the example of user profile information retrieved from a third party service is a non-limiting example shown for the purposes of discussion herein. Accordingly, the user interface 105 is populated with information retrieved from a third party service and potentially with images, fonts, etc., or other visual elements that are retrieved from the third party service. Additionally, the user interface 105 in the depicted example is also generated by the application's making of API calls into a software library associated with the third party service.

Accordingly, embodiments of the disclosure allow for the updating of logic and/or user interface elements that are provided by a software library without requiring the generating of a new application binary corresponding to the application and/or restarting of execution of the application. As noted above, the application may be created by a developer that is not the same as an entity operating the application marketplace and/or one that provides the functionality of the software library. Embodiments of the disclosure can allow for updateable code to be stored within the software library and/or accessible to the client device 103, where the updateable code comprises scripting language code, images, text, video, or other elements that can be updated without requiring the creation of a new binary application that requires redistribution and reinstallation on client devices 103 and/or restarting of execution of the application. In the following discussion, a general description of the system and its components is provided, followed by a discussion of the operation of the same.

Figure 2:
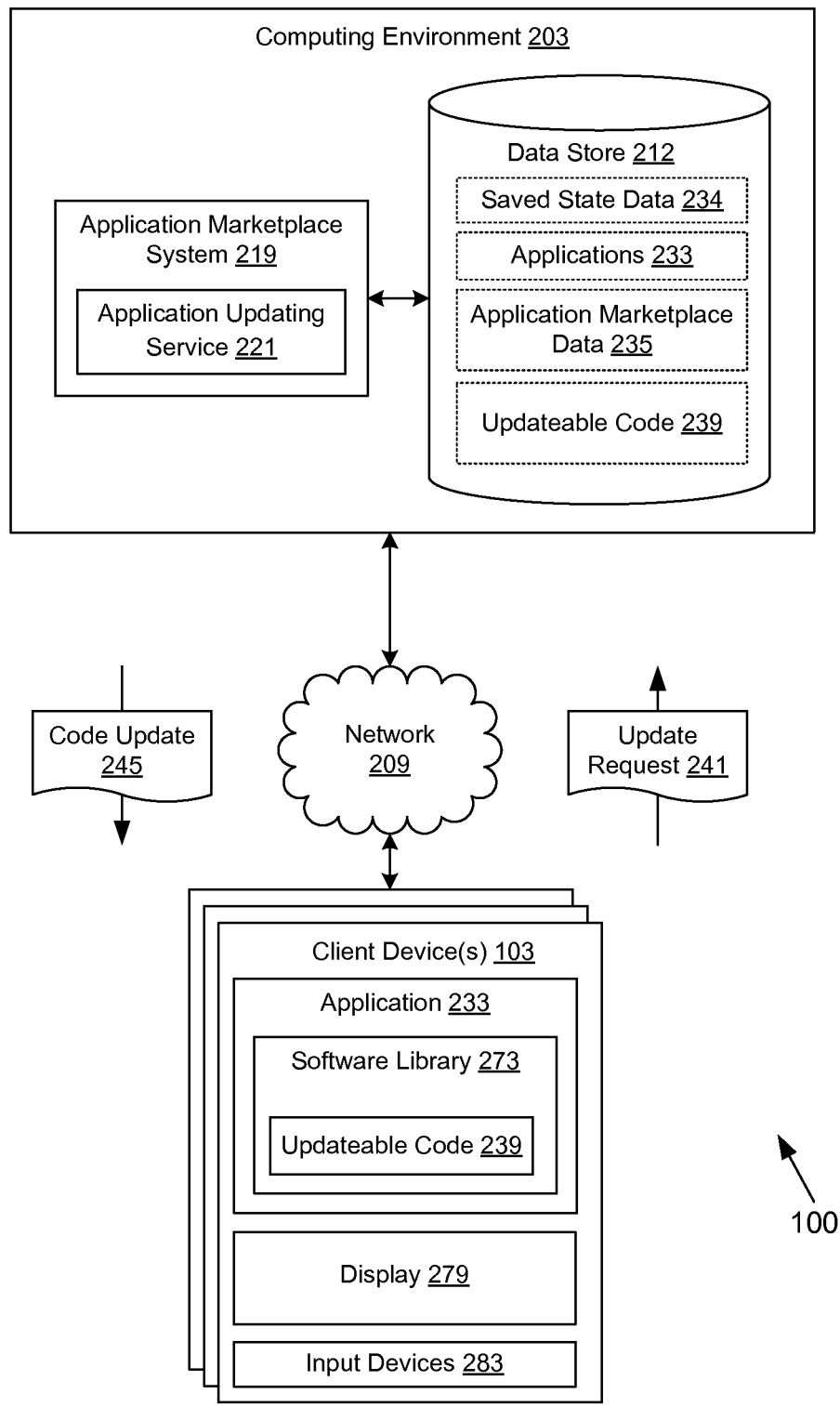
FIG. 2 is a drawing of a networked environment according to various embodiments of the present disclosure.

Turning now to FIG. 2, shown is a networked environment 200 according to various embodiments. The networked environment 200 includes a computing environment 203 and one or more clients 103 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an application marketplace system 219, application updating service 221 and other applications, services, processes, systems, engines, or functionality not discussed in detail herein. The application marketplace system 219 may communicate with the client device 103 using various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 209.

The application marketplace system 219 is executed to provide functionality relating to an application marketplace in which a multitude of applications 233 may be submitted by developers and made available for purchase and/or download by users. The application marketplace system 219 may include functionality relating to electronic commerce, e.g., shopping cart, ordering, and payment and other systems. The application marketplace system 219 may support searching and categorization functionality so that users may easily locate applications 233 that are of interest. The application marketplace system 219 may include functionality relating to verification of compatibility of applications 233 with various clients 103. The application updating service 221 is executed to provide updateable code to client devices 103 to update an application 233 executed by the client device 103, as will be described in further detail herein.

The data stored in the data store 212 includes, for example, applications 233, saved state data 234 relating to applications 233 that are executed by client devices 103, application marketplace data 235, updateable code 239 and potentially other data. The applications 233 correspond to those applications 233 that have been submitted by developers and/or others, for example, for inclusion in the application marketplace. The application 233 may correspond, for example, to a game or other types of applications. As non-limiting examples, the application 233 may correspond to a first-person shooter game, an action game, an adventure game, a party game, a role-playing game, a simulation game, a strategy game, a vehicle simulation game, and/or other types of games. The application 233 may be a game originally designed for execution in a general-purpose computing device or in a specialized video game device such as, for example, a video game console, a handheld game device, an arcade game device, etc. The applications 233 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. Where game applications are mentioned in the following text, it is understood that game applications are merely examples of the many different types of applications 233.

The application 233, when executed by a client device 103, may expect to access one or more resources of the client device on which it is executed. Such resources may correspond to display devices, input devices, or other devices. In some cases, the application 233 may request exclusive access to one or more of the resources, whereby no other applications may have access to the particular resources. Each application 233 may include, for example, object code, source code, metadata and/or other data. The object code corresponds to code that is executable by clients 103, either natively by a processor or by way of a virtual machine executed by the processor.

The saved state data 234 that is maintained by the application marketplace system 219 includes various data relating to execution of applications 233 by client devices 103. For example, the saved state data 234 may include information about progress of a user within execution of an application by users, such as a level at which a user has progressed within a game, scoring information, achievement information relating to a game, etc.

The data associated with the application marketplace data 235 includes, for example, download information, categories, application usage data and/or other data. The download information indicates the popularity, either in terms of absolute number of downloads or in terms of relative popularity, of the applications 233 offered by the application marketplace data 235. The download information can also identify users, either individually by a user account and/or on an aggregate basis according to demographic category, that have downloaded a particular application 233. The categories correspond to groupings of applications 233 that may indicate similar applications 233 and may be employed by users to more easily navigate the offerings of the application marketplace data 235. Non-limiting examples of categories may include social networking applications 233, mapping applications 233, movie information applications 233, shopping applications 233, music recognition applications 233, and so on. The application marketplace data 235 can also include information about users, such as user profile data, user authentication information, usage data of users with regard to application 233 (e.g., game progress, high scores, achievements).

Updateable code 239 comprises scripting language code, markup language, imagery, and/or other data that can be transmitted to a client device 103 to update a software library 273 according to embodiments of the disclosure. The software library 273 can be configured according to embodiments of the present disclosure to accept updateable code 239 and store the updateable code 239 within and/or accessible to the client device 103. A software library 273 can also be configured to execute logic and/or utilize elements within the updateable code 239 without requiring the creation of a new version of the application 233 in which the software library 273 is employed.

The client 103 is representative of a plurality of client devices that may be coupled to the network 209. The clients 103 may be geographically diverse. The client 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 103 may include a display device 279. The display 279 may comprise, for example, one or more devices such as cathode ray tubes (CRTs), liquid crystal display (LCD) screens, gas plasma-based flat panel displays, LCD projectors, or other types of display devices, etc. The client 103 may include one or more input devices 283. The input devices 283 may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices 283 may incorporate haptic technologies in order to provide feedback to the user.

The client 103 may be configured to execute various applications 233 that are distributed via the application marketplace system 219. An application 233 executed by a client device 103, as is noted above, can be bundled with one or more software library 273 that provides functionality that is called by the application 233 code.

For example, a software library 273 can provide device hardware APIs through which the application 233 may access a device resource. As another example, a software library 273 can also provide functionality associated with the application marketplace system 219, such as user authentication, retrieval of user information for display within user interfaces of the application 233, processing of payment transactions associated with the application marketplace system 219, or other functionality that can be associated with the application marketplace system 219. As yet another example, a software library 273 can also provide functionality associated with a gaming service in which user achievements associated with one or more game applications 233 can be tracked and/or displayed, scoring data associated with a user accounts or other user accounts can be tracked and/or displayed, or other information can be exchanged. Additionally, a software library 273, when invoked by an application 233, can also retrieve and/or display user interfaces that are rendered by the application 233 and/or code associated with the software library 273 on a display device 279 associated with the client 103. The updateable code 239 is code associated with a software library 273 that can be updated according to various embodiments of the present disclosure.

Next, a general description of the operation of the various components of the networked environment 200 is provided. To begin, an application 233 created by a developer can be created and distributed to a client device 103 associated with a user via the application marketplace system 219. The application 233 can be configured to employ functionality provided by a software library 273. For example, the application 233 can be configured to invoke an API call associated with the software library 273 that in turn invokes updateable code 239. The updateable code 239 is stored within the client device 103 or storage accessible to the client device 103 and comprises a scripting language code fragment provides various types of functionality. For example, the scripting language code can provide an authentication workflow in which a user is authenticate with a third party service. In this example, the authentication workflow can involve the rendering of user interface elements, such as input fields in which a user can provide authentication credentials. User interface elements can also include various images, video, text, fonts, markup language, style sheets, and/or any other elements that can specify user interface elements rendered by the client device 103.

The updateable code 239 can be configured with logic that, when invoked by the application 233, performs logical operations and/or displays other information or user interface elements that can be supported by a scripting language and/or presentation language. For example, the updateable code 239 that authenticates a user can be configured to encourage the user to register with a particular third party service or display other promotional information based upon a determination by the logic programmed within scripting language code in the updateable code 239 of a particular condition. As another example, the updateable code 239 can also allow retrieval of data from a service via the network 209 for use by other native code associated with the software library 273 and/or the application 233.

The software library 273 as well as the application 233 can be implemented in native object code and/or binary code that is natively compatible with the client device 103. In contrast, the updateable code 239 may comprise code that is implemented within an interpreted scripting language as well as other content that can be referenced by the interpreted scripting language and/or other code within the software library 273. The updateable code 239 can be organized into various portions that are linked with a particular functional call of the software library 273. The updateable code 239, when embodied in the form of scripting language code, can comprise JavaScript, PHP, Perl, or any other scripting language. The updatable code 239 can also comprise markup language (or code that generates markup language), which can correspond to user interface elements rendered by the client device 103. The updatable code 239 can also include style sheets, such as cascading style sheets (CSS) that specify presentation elements within the markup language and/or other user interface elements associated with an API call to the software library 273.

Therefore, upon execution of an application 233 by a client device 103, the application 233 can determine whether the client device 103 can access the application updating service 221 (e.g., whether the client device 103 has network access). If so, the application 233 can be instrumented to invoke an API call associated with the software library 273 that determines whether the updateable code 239 should be updated. In one embodiment, the software library 273 can generate an update request 241 that provides a version of the updateable code 239.

Such a request can be transmitted to the application updating service 221. The application updating service 221 can then extract a version or version number of the updateable code 239 from the update request 241 and consult the version or version number of the latest updateable code 239 stored within the data store 212. If the application 233 instance executing within the client device 103 is not configured with the latest version of the updateable code 239, the application updating service 221 can provide the latest version of the updatable code 239 to the client device 103. In other words, the application updating service 221 can generate a code update 245 that is transmitted to the client device 103.

Upon receiving the code update 245, the software library 273 can then store the updated version of the updateable code 239 within the client device 103. Accordingly, because the updateable code 239 is provided in the form of scripting language code and/or other content, such as imagery, video, text, configuration values, etc., the updateable code 239 can be updated without updating the application 233 and/or generating an updated application 233 in binary form. In other words, the updateable code 239 can update the logical operation of the software library 273 by updating scripting language code that is utilized by the software library 273.

In one example, the logic of the application updating service 221 can be implemented within the software library 273 such that the software library 273 can make a determination as to whether an updated version of updateable code 239 is available. In such a scenario, the software library 273 can be configured to check a version number of code available via a network accessible code repository to determine whether an updated version of updateable code 239 is available as compared to a version of the updateable code 239 stored on the client device 103.

In one embodiment, the application updating service 221 can also be instrumented to obtain an update to updateable code 239 corresponding to a software library 273 from a developer that is in turn stored within the data store 212. The updated updateable code 239 corresponding to the software library 273 can then be pushed as a code update 245 to an instance of an application 233 and/or software library 273 that is stored within a client device 103. In this way, a developer can update a software library 273 by transmitting an update to updateable code 239 to the application updating service 221, which can in turn store the code update in the data store 212 as well as push a code update 245 to client devices 103 on which the associated software library 273 is employed.

Accordingly, in this scenario, the application updating service 212 can identify one or more client devices 212 from the application marketplace data 235 in which the application 233 and/or the software library 273 is installed. The application updating service 212 can then distribute a code update 245 that incorporates the updateable code 245 to those client devices 103 on which the application 233 and/or software library 273 incorporating the updateable code 245 are installed.

Figure 3A:
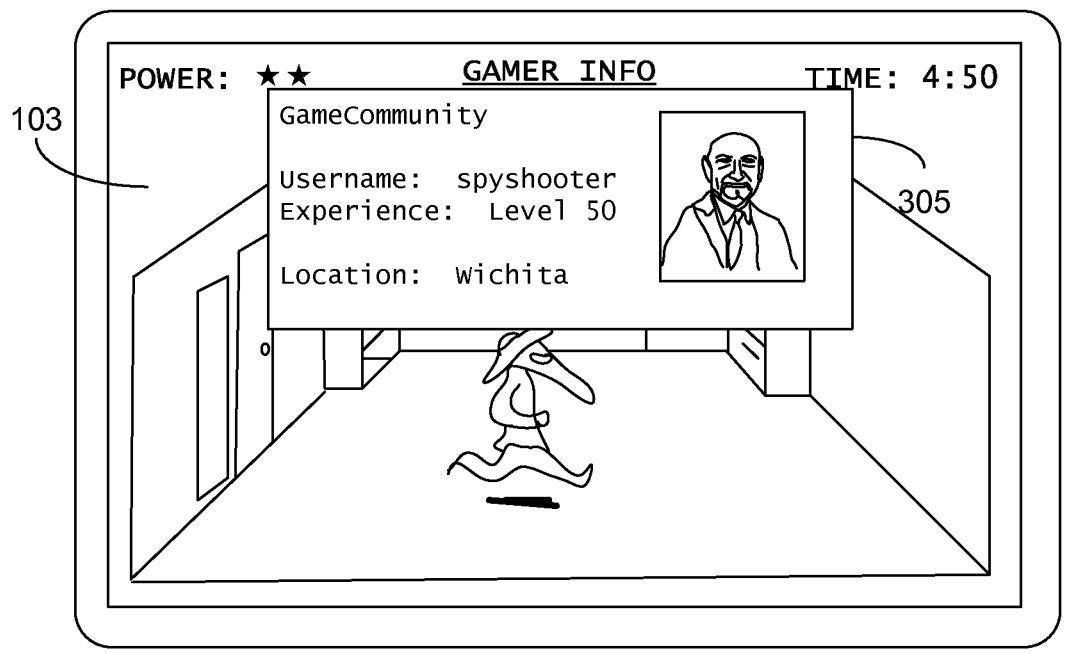
FIGS. 3A-3B are drawings of example application executed by client applications according to various embodiments of the present disclosure.
Figure 3B:
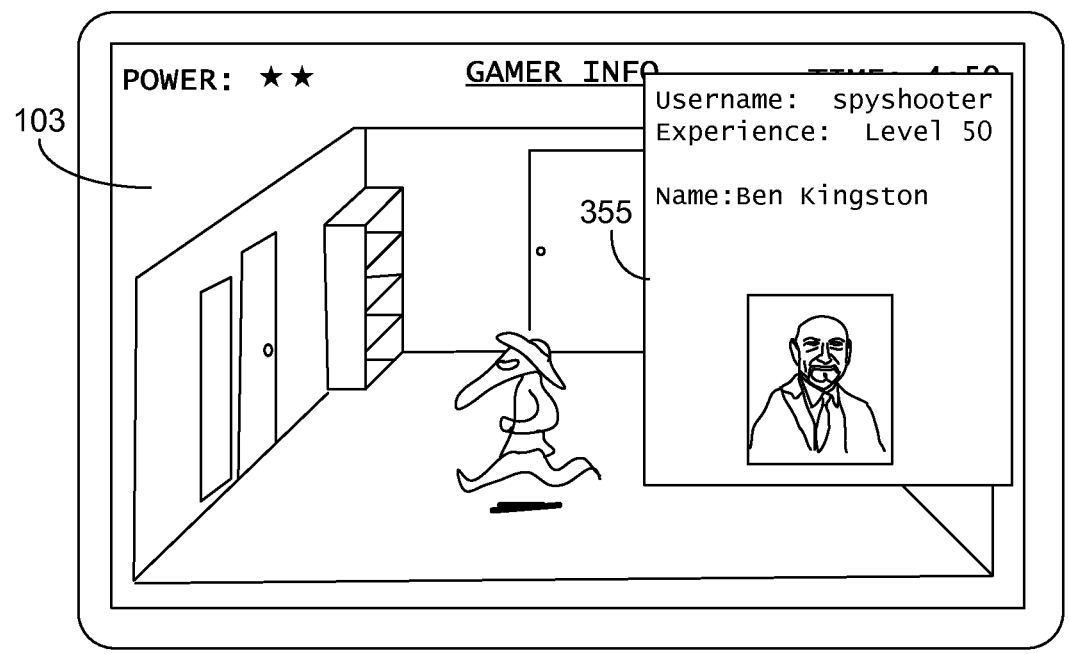

Turning now to FIGS. 3A-3B, shown are examples of an application 233 executed on a client device 103 according to embodiments of the present disclosure. In the depicted example, the application 233 invokes a software library 273 that incorporates updateable code 239 that includes scripting language code, imagery, text, and/or other data that is embedded within the updateable code 239 and/or retrieved from a third party service. In the example of FIG. 3A, the updateable code 239 specifies user interface elements that are rendered by the client device 103 when the application 233 invokes an API call provided by the software library 273 that in turns executes and/or references the updateable code 239.

In the example of FIG. 3A, the updateable code 239 retrieves information from a gaming service and/or social networking system. The updateable code can also include 239 images, markup language and/or any other data that can specify and/or direct the rendering of a user interface 305 by the client device 103. Additionally, the updateable code 239 can also specify a location on the display device associated with the client 103 in which the user interface 305 should be placed. The updateable code 239 can also modify logical operations executed by the software library 273 that is utilized by the application 233. In this way, an application 233 can be updated without requiring the creation of a new application 233 binary that is distributed to client devices 103 and installed on the client device 103. Embodiments of the disclosure can provide a mechanism whereby an application 233 can update itself by determining whether updateable code 239 that is published in a code repository accessible via the network 209 should be retrieved and updated within the client device 103. Accordingly, the software library 273 can be implemented as a software wrapper that executes scripting language code that is stored as updateable code 239 within the client device 103, thereby allowing the logical function of a software library 273 to be updated without updating the entire application 233.

Continuing the example of FIG. 3A, reference is now made to FIG. 3B. In the example shown in FIG. 3B, the updateable code 239 is updated via the application updating service 221. Accordingly, the updated updateable code 239 may include alternative scripting language code that specifies different user interface elements, such as varying fonts, images, text, and/or a different location within display device in which the user interface 355 should be displayed. Accordingly, in this way, the updateable code 239 can be updated by the application updating service 221 to provide an updated user interface experience without requiring the creation of a new application 233 binary as well as its distribution and installation on the client device 103. Additionally, as other examples of scenarios in which updateable code 239 can be employed, the software library 273 can employ updateable code 239 to specify a format of and/or retrieve data from a service that is accessible via the network 209. In this way, a network accessible service and/or the data format employed by the service can be updated without requiring the creation of a new application 233 binary as well as its distribution and installation on the client device 103.

As noted above, the updateable code 239 can update any logical operation of any functionality employed by the software library 273. For example, if the software library 273 is relied upon by the application 233 to perform authentication of the user with a service accessible via the network 209, the software library 273 can employ updateable code 239 to execute the authentication workflow. Consequently, the authentication workflow can be modified and updated via providing updateable code 239. In this scenario, the authentication workflow can be updated by modifying when and in what scenarios information is presented to the user and/or various operations are performed. In this way, not only can content that is shown to a user be updated, but logic that specifies when and in what scenarios content is shown to the user can also be updated. Similarly, other logical operations can also be updated via use of updateable code 239, such as calculations performed by the software library 273, configuration settings of the software library 273, or any other logical functions that can expressed in scripting language code that is bundled with the updateable coded 239.

Figure 4:
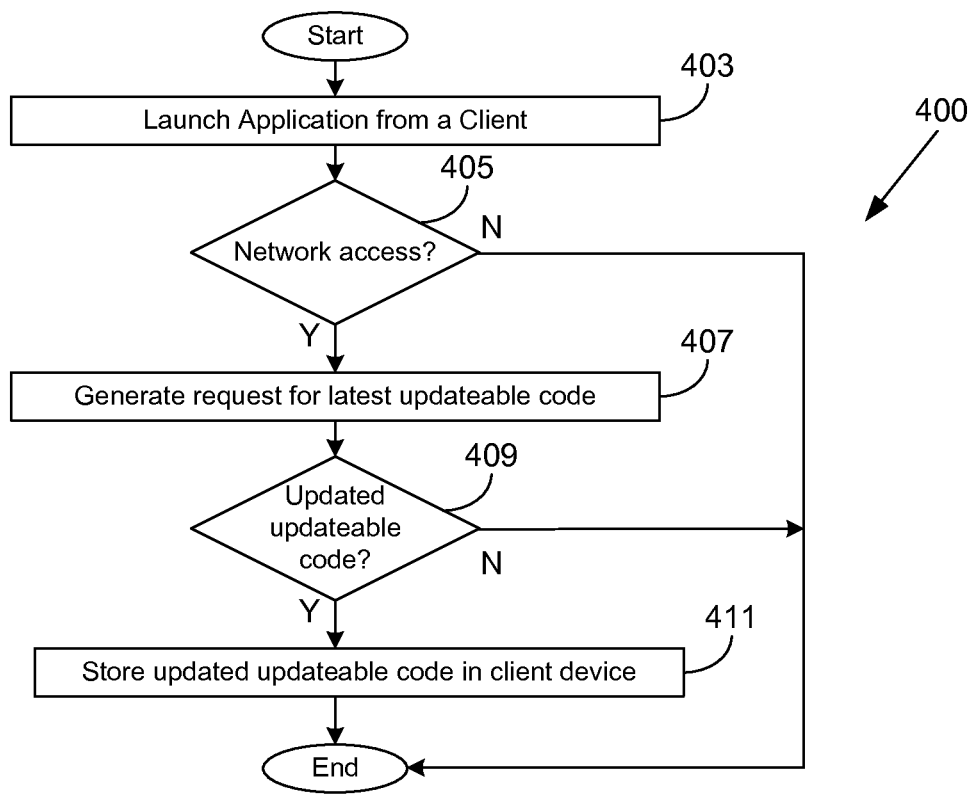
FIG. 4 is a flowchart illustrating one example of functionality implemented as portions of a client application executed in a client device according to various embodiments of the present disclosure.

Referring next to FIG. 4, shown is a flowchart 400 that provides one example of an application 233 executed by a client device 103 according to various embodiments. It is understood that the flowchart of FIG. 4 provides merely an example of the many different types of functional arrangements that may be employed to implement the operation of the portion of an application 233 employing a software library 273 and updateable code 239 as described herein. As an alternative, the flowchart of FIG. 4 may be viewed as depicting an example of steps of a method implemented in the client device 103 (FIG. 2) according to one or more embodiments.

Beginning with box 403, the application 233 initiates execution on a client device 103. The application 233 can be instrumented to check for an update to updateable code 239 associated with software libraries 273 upon execution and/or upon invocation of a software library 273 that employs updateable code 239. At box 405, the application 233 determines whether the client device 103 has network access and/or can access the application updating service 221. If not, then the portion of the application 233 ends execution. If so, then in box 407 the application 233 generates a request for an updated version of the updateable code 239. Such a request can include a version associated with the current version of the updateable code 239 that is stored within the client device 103. At box 409, the application 233 determines whether an updated version of the updateable code 239 is available at and/or received from the application updating service 221. If so, then in box 411, the application 233 stores the updateable code 239 within and/or accessible to the client device 103.

Figure 5:
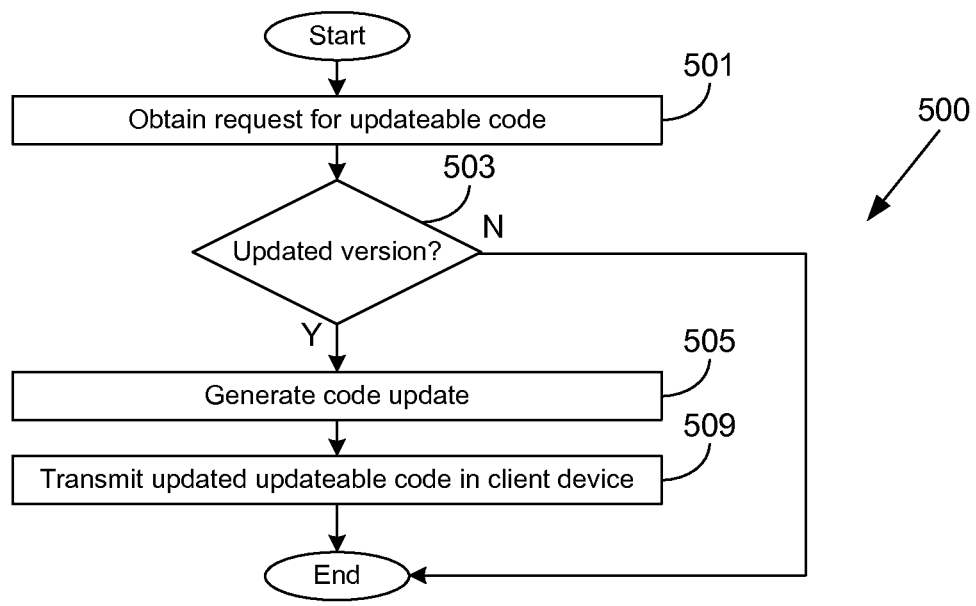
FIG. 5 is a flowchart illustrating one example of functionality implemented as portions of an application updating service executed in a computing environment according to various embodiments of the present disclosure.

Referring next to FIG. 5, shown is a flowchart 500 that provides one example of execution of the application updating service 221 executed by a computing environment 203 according to various embodiments. It is understood that the flowchart of FIG. 5 provides merely an example of the many different types of functional arrangements that may be employed to implement the operation of the portion of an application updating service 221 as described herein. As an alternative, the flowchart of FIG. 5 may be viewed as depicting an example of steps of a method implemented in the computing environment 203 according to one or more embodiments.

Beginning with box 501, the application updating service 221 obtains a request to update updateable code 239 from a client device 103 executing an application 233 that employs a software library 273 including updateable code 239. In box 503, the application updating service 221 determine whether the updateable code 239 employed by the client 103 should be updated. In one embodiment, the application updating service 221 can make such a determination by extracting a version associated with the updateable code 239 from the request and determining whether an updated version of the updateable code 239 is available. If not, then the portion of the execution of the application updating service 221 ends. If so, then in box 505, the application updating service 221 generates a code update that includes the updated version of the updateable code. In box 509, the code update is transmitted to the requesting client device 103.

Figure 6:
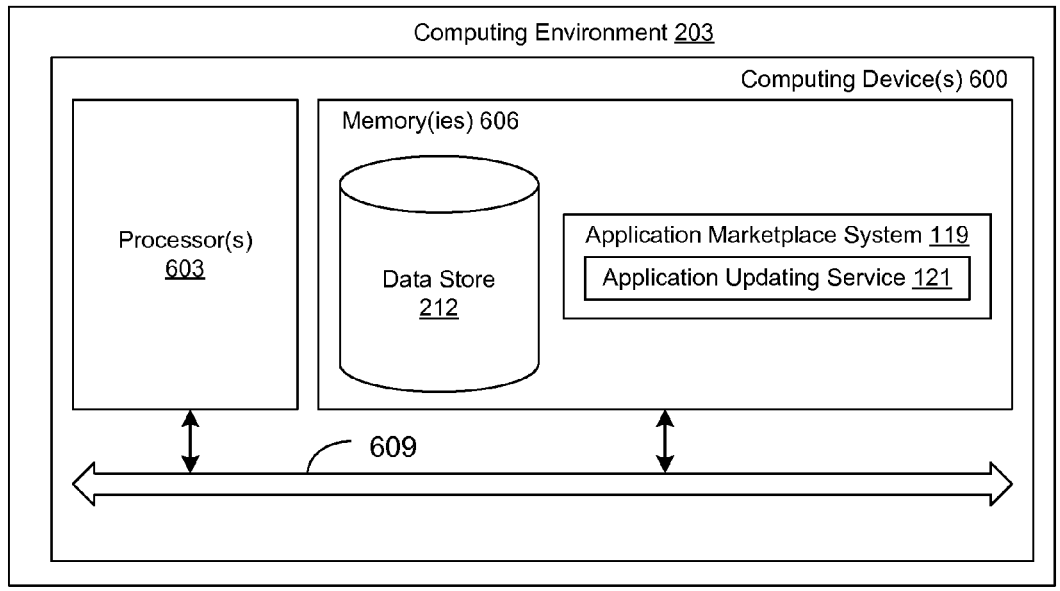
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the application marketplace system 219, application updating service 221, and potentially other applications. Also stored in the memory 606 may be a data store 212 and other data. In addition, an operating system may be stored in the memory 606 and executable by the processor 603.

Figure 7:
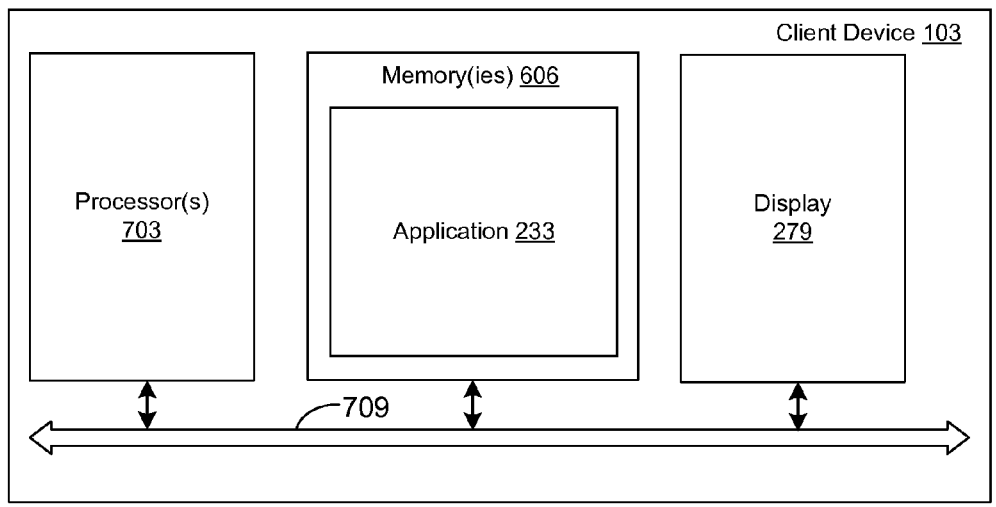
FIG. 7 is a schematic block diagram that provides one example illustration of a client device employed in the networked environment of FIG. 2 according to various embodiments of the present disclosure.

With reference to FIG. 7, shown is a schematic block diagram of the client device 103 according to an embodiment of the present disclosure. The client device 103 includes at least one processor circuit, for example, having a processor 703 and a memory 706, both of which are coupled to a local interface 709. The local interface 709 may comprise, for example, a data bus with an accompanying address/control bus or other bus structure as can be appreciated. A display 279 may also be coupled to the local interface 709.

Stored in the memory 706 are both data and several components that are executable by the processor 703. In particular, stored in the memory 606 and executable by the processor 703 are an application 233 and potentially other applications and/or software. In addition, an operating system may be stored in the memory 706 and executable by the processor 703.

It is understood that there may be other applications that are stored in the memory 606, 706 and are executable by the processor 603, 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606, 706 and are executable by the processor 603, 703. In this respect, the term "executable" means a program file that is in a form that can ultimately be run by the processor 603, 703. Examples of executable programs may be, for example, a compiled program that can be translated into machine code in a format that can be loaded into a random access portion of the memory 606, 706 and run by the processor 603, 703, source code that may be expressed in proper format such as object code that is capable of being loaded into a random access portion of the memory 606, 706 and executed by the processor 603, 703, or source code that may be interpreted by another executable program to generate instructions in a random access portion of the memory 606, 706 to be executed by the processor 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606, 706 is defined herein as including both volatile and nonvolatile memory and data storage components. Volatile components are those that do not retain data values upon loss of power. Nonvolatile components are those that retain data upon a loss of power. Thus, the memory 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603, 703 may represent multiple processors 603, 703 and/or multiple processor cores and the memory 606, 706 may represent multiple memories 606, 706 that operate in parallel processing circuits, respectively. In such a case, the local interface 609, 709 may be an appropriate network that facilitates communication between any two of the multiple processors 603, 703, between any processor 603, 703 and any of the memories 606, 706, or between any two of the memories 606, 706, etc. The local interface 609, 709 may comprise additional systems designed to coordinate this communication, including, for example, performing load balancing. The processor 603, 703 may be of electrical or of some other available construction.

Although the application marketplace system 219, application updating service 221 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 4-5 show the functionality and operation of an implementation of portions of the application updating service 221 and/or application 233 executed by a client device 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIG. 4-5 show a specific order of execution, it is understood that the order of execution may differ from that which is depicted. For example, the order of execution of two or more blocks may be scrambled relative to the order shown. Also, two or more blocks shown in succession in flowcharts of FIG. 4-5 may be executed concurrently or with partial concurrence. Further, in some embodiments, one or more of the blocks shown in flowcharts of FIG. 4-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application updating service 221, application 233, or any other application or service, that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:
   obtain a request from an application executed by a client device for an update to updateable code embedded within an application marketplace library, the application marketplace library being stored in the client device and comprising an application programmable interface (API) utilized by the application to facilitate providing authentication functionality associated with an application marketplace system;
   receive a version associated with the updateable code stored within the client device, the updateable code comprising scripting language code and content elements referenced by the scripting language code, the updateable code modifying a plurality of authentication operations executed by the application marketplace library by updating the scripting language code that is used by the application marketplace library;
   determine that an updated version of the updateable code has been published via the application marketplace based at least in part upon the version;
   obtain the updated version of the updateable code; and
   facilitate storing the updated version of the updateable code within the client device, wherein storing the updated version causes updating of the scripting language code within the application marketplace library.

2. The non-transitory computer-readable medium of claim 1, wherein a scripting language corresponding to the scripting language code comprises a client-side scripting language that is executable by the client device.

3. The non-transitory computer-readable medium of claim 1, wherein the authentication operations executed by the application marketplace library are associated with an authentication user interface displayed by a function called by the application within the application marketplace library.

4. The non-transitory computer-readable medium of claim 1, wherein the authentication operations executed by the application marketplace library specify a plurality of user interface elements that are displayed by the application via the client device in response to the application invoking a function call provided by the application marketplace library.

5. The non-transitory computer-readable medium of claim 1, wherein the authentication operations executed by the application marketplace library specify which of a plurality of user interface elements should be displayed by the application via the client device.

6. A system, comprising:
   a client device; and
   an application executable in the client device, wherein, when executed, the application causes the client device to at least:
      initiate execution of functionality associated with the application, the application being associated with an application marketplace;
      determine that an application updating service is accessible to the client device via a network;
      request an updated version of updateable code within an application marketplace library;
      receive the updated version of the updateable code, the updateable code comprising scripting language code embodying authentication logic employed by the application marketplace library, the updated version of the updateable code modifying the authentication logic employed by the application marketplace library by updating the scripting language code that is used by the application marketplace library; and
      replace a previous version of the updateable code stored on the client device with the updated version of the updateable code, wherein the updateable code is updated within the application marketplace library.

7. The system of claim 6, wherein the updateable code is updated within the application marketplace library without restarting of the application.

8. The system of claim 6, wherein the updateable code is associated with a plurality of user interface elements rendered by the application on a display of the client device.

9. The system of claim 8, wherein the updateable code further comprises at least one of images, animation, video, markup language specifying a presentation of the user interface elements or text referenced by the scripting language code.

10. The system of claim 8, wherein the scripting language code is further configured to at least authenticate a user associated with the application with a service accessible via the network.

11. The system of claim 10, wherein the scripting language code is further configured to at least modify an authentication workflow of the user associated with the application with the service accessible via the network.

12. The system of claim 6, wherein the application marketplace library is configured to invoke the scripting language code to perform an action related to a user account within the application marketplace.

13. The system of claim 12, wherein the updated version of the updateable code modifies logic associated with the action related to the user account within the application marketplace.

14. The system of claim 6, wherein the application marketplace library is configured to validate the updated version of the updatable code.

15. A method, comprising:
   requesting, via at least one computing device, an update to updateable code within an application marketplace library bundled with an application;
   obtaining, via the at least one computing device, the update to the updateable code within the application marketplace library, the updateable code comprising scripting language code defining logic executed by the application marketplace library;
   identifying, via the at least one computing device, a client device on which the application is installed, the client device being associated with a user of an application marketplace;
   generating, via the at least one computing device, a code update associated with the update to the updateable code, the code update modifying a plurality of authentication operations executed by the application marketplace library by updating the scripting language code that is used by the application marketplace library; and transmitting, via the at least one computing device, the code update of the updateable code to the client device, wherein the updateable code is updated within the application marketplace library.

16. The method of claim 15, wherein the update to the updateable code modifies logic associated with an action performed with respect to the application marketplace.

17. The method of claim 15, wherein the scripting language code is configured to cause the client device to render user interface elements associated with the application marketplace on a display device associated with the client device.

18. The method of claim 17, wherein the update to the updateable code further modifies when the user interface elements are rendered on the display device associated with the client device.

19. The method of claim 18, wherein the scripting language code is further configured to generate markup language associated with the user interface elements when the scripting language code is executed by the client device.

20. The method of claim 15, wherein the scripting language code is configured to facilitate communication with the application marketplace on behalf of the user associated with the client device.

21. The method of claim 20, wherein the scripting language code is configured to authenticate credentials provided by the application to the updateable code with the application marketplace via a network service request transmitted to the application marketplace via a network.

22. The method of claim 15, wherein the update to the updateable code is configured to modify an expected data format of data obtained from a network service.

* * * * *